United States Patent [19]

Takimoto

[11] Patent Number: 4,760,474
[45] Date of Patent: Jul. 26, 1988

[54] INFORMATION SIGNAL REPRODUCING APPARATUS WITH TRACK PITCH DISCRIMINATING FUNCTION

[75] Inventor: Hiroyuki Takimoto, Kanagawa, Japan

[73] Assignee: Canon Kabushiki Kaisha, Tokyo, Japan

[21] Appl. No.: 882,183

[22] Filed: Jul. 7, 1986

[30] Foreign Application Priority Data

Jul. 8, 1985 [JP] Japan .................................. 60-149480

[51] Int. Cl.$^4$ ...................... G11B 15/14; G11B 15/467
[52] U.S. Cl. ........................................ 360/64; 360/73; 360/77
[58] Field of Search .................... 360/73, 9.1, 77, 137, 360/84, 61, 64, 70, 75, 10.2, 10.3, 18, 27, 85; 369/50, 51

[56] References Cited

U.S. PATENT DOCUMENTS 4,594,618  6/1986  Kozuki et al. ........................ 360/73
4,683,503  7/1987  Takimoto .............................. 360/64

*Primary Examiner*—Raymond F. Cardillo
*Assistant Examiner*—Steven R. Garland
*Attorney, Agent, or Firm*—Toren, McGeady & Associates

[57] ABSTRACT

An information signal reproducing apparatus for reproducing information signals from a record bearing medium having many recording tracks which are formed with the information signals on the medium and are spaced at a track pitch selected from a plurality of track pitches is arranged to reproduce the information signals by head means which traces the medium; to perform tracking control by using the signals reproduced by the head means; and to detect the track pitch by comparing with a reference level each of the levels of signals reproduced by the head means from recording tracks neighboring a recording track presently controlled by a tracking control action on both sides of the controlled track. After discriminating the track pitch, the apparatus selects the rotary heads with the proper width and sets the tape speed so that the speed reproduction is at the same speed at which the tape was recorded.

19 Claims, 3 Drawing Sheets

INFORMATION SIGNAL REPRODUCING APPARATUS WITH TRACK PITCH DISCRIMINATING FUNCTION

BACKGROUND OF THE INVENTION

1. Field of the Invention

This invention relates to an information signal reproducing apparatus, and more particularly, to an apparatus for reproducing information signals recorded in many recording tracks which are formed on a record bearing medium and spaced at a track pitch selected out of a plurality of different track pitches.

2. Description of the Related Art

In the following description, the apparatuses of the above-stated kind are exemplified by video tape recorders (hereinafter referred to as VTR's): The number of VTR's of the kind arranged to permit selection of a track pitch from different pitches have recently increased. The VTR of this kind is required to automatically shift the reproducing travel speed of the tape employed as a record bearing medium and/or the reproducing head employed to the track pitch employed in recording. To meet this requirement, the VTR has been generally arranged to detect the track pitch from the reproduced frequency of a control (CTL) signal which is recorded at an edge part of the tape to indicate the track pitch employed. Meanwhile, in the case of the VTR arranged to perform tracking control in a manner called the four-frequency tracking control method, the track pitch is found, for example, by detecting the varying period of a tracking error signal.

In accordance with the above-stated conventional method, however, the frequency of the period of the signal used in finding the track pitch varies with the travelling speed of the tape. As a result, it has been possible for the VTR to detect the track pitch only in the case of normal reproduction. The VTR is used not only for normal speed reproduction but also for special speed reproduction such as slow motion reproduction, high speed search reproduction, etc. For the special reproducing operation, the tape travel speed is set at varied speeds. It has been, therefore, difficult to detect, at the time of special reproduction, the pitch at which the recording tracks are formed during recording. In order to make it possible, the VTR must be arranged to shift a circuit constant, a threshold value to be used for discrimination, etc., thereof every time the tape travel speed is changed. Such arrangement results in an extremely complex circuit arrangement.

Further, in the case of an arrangement for detect the track pitch on the basis of the varying period of the tracking error signal according to the four-frequency method, the varying period fluctuates according to the degree of linearity of the recording tracks. Accordingly, in case that the tracking error signal is obtained from reproduced pilot signals which are recorded at low levels and the track pitch is discriminated from the varying period of such low level signals, the track pitch tends to be erroneously detected.

SUMMARY OF THE INVENTION

It is therefore an object of this invention to provide an information signal reproducing apparatus which is capable of accurately discriminating the track pitch.

It is another object of this invention to provide an information signal reproducing apparatus which is capable of accurately discriminating the track pitch irrespective of the medium tracing direction taken during reproduction, with an extremely simple circuit arrangement.

Under this object, an information signal reproducing apparatus, arranged as an embodiment of this invention to reproduce information signals from a record bearing medium having many recording tracks which are formed with the information signals on the medium and are spaced at a track pitch selected from a plurality of track pitches, comprises: head means for reproducing the information signals by tracing the record bearing medium; tracking control means for controlling the positions of the head means and the record bearing medium relative to each other by using signals reproduced by the head means; detecting means which produces two detection signals indicative of the levels of signals reproduced by the head means from two recording tracks neighboring a recording track presently controlled recording by the tracking control means on both sides of the controlled track; a pair of comparison means for respectively comparing the two detection signals with reference levels; and means for discriminating the track pitch on the basis of outputs of the pair of comparison means.

The above and further objects and features of this invention will become apparent from the following detailed description of a preferred embodiment thereof taken in conjunction with the accompanying drawings.

DETAILED DESCRIPTION OF THE PREFERRED EMBODIMENT

Figure 1:
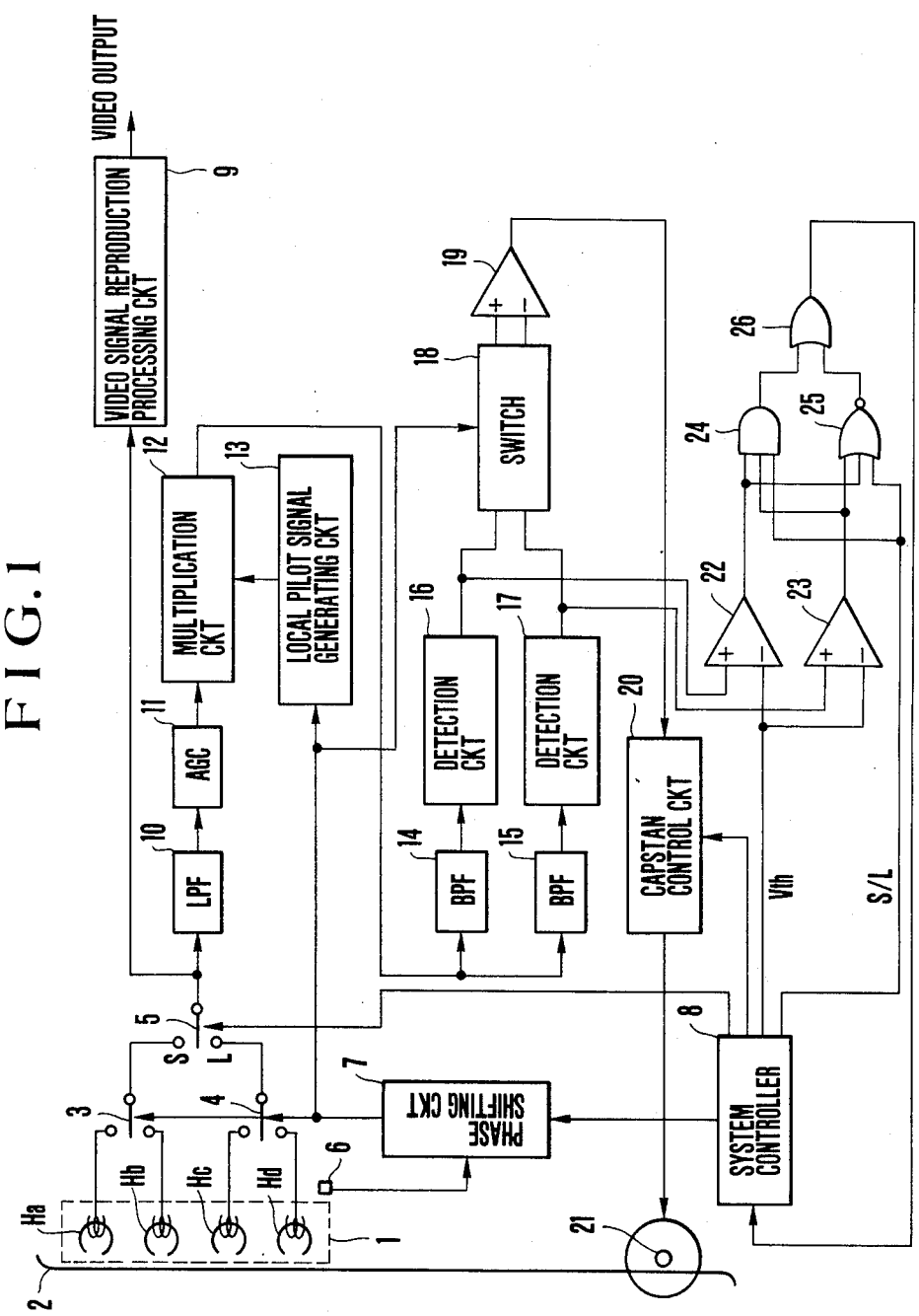
FIG. 1 is a diagram showing a VTR arranged as an embodiment of this invention.
Figure 2:
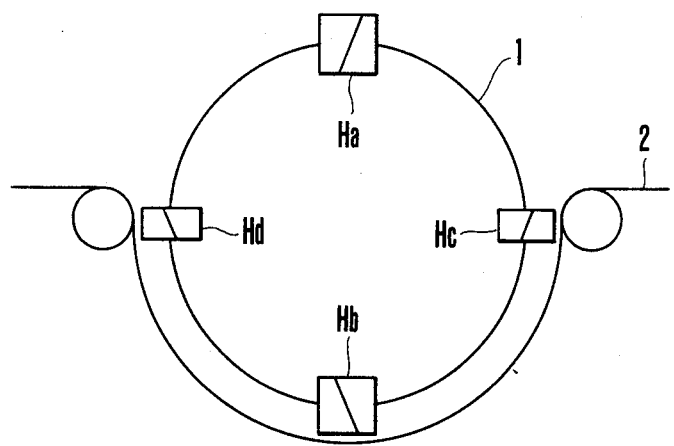
FIG. 2 is a schematic illustration of the allocation of the heads of the VTR.

An embodiment of this invention, in which the invention is applied to a VTR performing tracking control according to the four-frequency method, is arranged as described below with reference to the accompanying drawings:

FIG. 1 shows the arrangement of the VTR. FIG. 2 shows the allocation of the heads of the VTR. In this case, the VTR is arranged to be capable of performing recording and reproducing not only with a wide track pitch in a standard manner (hereinafter referred to as the SP mode) but also with a narrow track pitch in a long time mode (hereinafter referred to as the LP mode).

Referring to FIG. 2, heads Ha and Hb are for the SP mode and are mounted on a rotary cylinder 1 at a phase difference of 180 degrees between them. Other heads Hc and Hd are for the LP mode and are likewise mounted on the rotary cylinder 1 at a phase difference of 180 degrees between them. A magnetic tape 2 is wrapped $180+\theta$ degrees around the rotary cylinder 1. Recording and reproduction are thus arranged to be accomplished according to the known two-head helical scanning method.

Referring to FIG. 1, a detector 6 is arranged to detect the rotation of the rotary head cylinder 1 and produces a rectangular wave signal (hereinafter referred to as PG signal) in synchronism with the rotation of the cylinder 1. The phase of the PG signal is shifted by a phase shifting circuit 7 to a given degree determined for each of the SP and LP modes according to the rotation phase difference of the LP mode heads Hc and Hd from the SP mode heads Ha and Hb. Head change-over switches 3 and 4 are controlled by the PG signal coming via the phase shifting circuit 7. Switch-over between the SP and LP modes is automatically accomplished by a system controller 8.

The output signal of the switch 3 is produced as a reproduced RF signal via one terminal S of a switch 5 in the SP mode. The output signal of the switch 4 is produced as the reproduced RF signal via the other terminal L of the switch 5 in the LP mode. The reproduced RF signal produced from the switch 5 is supplied to a video signal reproduction processing circuit 9. This signal undergoes a known signal processing operation. As a result, the circuit 9 produces a video output in the form similar to a television signal.

Meanwhile, pilot signal components of four different frequencies, which are superimposed on the video signal in accordance with the four-frequency method, are separated by a low-pass filter (hereinafter referred to as LPF) 10. Assuming that the four different frequencies f1, f2, f3 and f4 of the pilot signals are recorded in rotation in the sequence of f1→f2→f3→f4, they are assumed to be in a relation of $f2-f1=f3-f4=fH$ and $f4-f1=f3-f2=3fH$ (wherein fH represents the horizontal scanning frequency of the recorded video signal). Each of the reproduced pilot signals, which is thus separated via the LPF 10, is supplied via an automatic gain control circuit (hereinafter referred to as AGG circuit) 11 to a multiplication circuit 12. Meanwhile, a local pilot signal generating circuit 13 is arranged to generate a reference signal (or a local pilot signal) of the same frequency as that of a pilot signal superimposed and recorded in a recording track presently being scanned under a reproducing operation and hence, under tracking control. The circuit 13 thus produces the local pilot signal the frequency of which changes in the sequence of f1→f2→f3→f4 according to the PG signal. The local pilot signal thus produced from the circuit 13 is supplied to the multiplication circuit 12 to be subjected to a multiplying operation together with the reproduced pilot signal.

Band-pass filters (BPF's) 14 and 15 are arranged to separate fH and 3fH components from the output of the multiplication circuit 12, respectively. As is well known, the outputs of the BPF's 14 and 15 correspond to pilot signal components reproduced from the adjacent recording tracks located on both sides of the track being mainly traced for reproduction. The outputs of the BPF's 14 and 15 are subjected to detection processes performed by detection circuits 16 and 17. The outputs of these detection circuits 16 and 17 are compared by a comparator 19 to obtain a tracking error signal. In this instance, however, the two adjacent or neighboring tracks, from which the 3fH and fH components are obtained, become converse every time the mainly tracing track changes from one over to another. Therefore, the connections of the detection circuits 16 and 17 to the comparator 19 are changed over by a switch 18 according the PG signal.

The tracking error signal obtained from the comparator 19 is supplied to a capstan control circuit 20 to be used as a capstan phase control signal. The circuit 20 controls a capstan 21 to cause it to rotate at a speed determined by a system controller 8. A track pitch discriminating operation is performed as described below with reference to FIG. 3.

Figure 3:
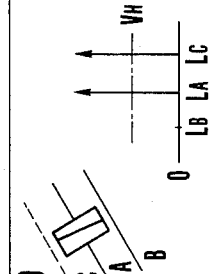
FIG. 3 is an illustration of the states of pilot signals reproduced under varied conditions.

FIG. 3 schematically shows the pilot signal components reproduced under different conditions including deviation of the reproduction mode from the recording mode and deviation of the reproducing head from the track to be traced for reproduction. In the case of FIG. 3, the track pitch obtained in the SP mode is assumed to be 20 μm, the track pitch obtained in the LP mode to be 10 μm, the track width of the heads Ha and Hb to be 30 μm and that of the heads Hc and Hd to be 15 μm. In FIG. 3, a reference symbol A denotes a track under reproduction control. Symbols B and C denote the neighboring tracks on both sides of the track A. Symbols $L_A$, $L_B$ and $L_C$ denote the levels of the pilot signal components reproduced from these tracks A, B and C.

In reproducing, in the SP mode, the record of a track which is recorded in the SP mode, if the heads Ha and Hb are adequately positioned on the reproducing track A (in an on-track state), a reproduced pilot signal is obtained with a predetermined level difference from the pilot signals obtained from the tracks B and C as shown at a part (a) in FIG. 3. If the position of the heads Ha and Hb is deviating from the track A toward the track C to an extent of one track width, the level of the pilot signal reproduced from the track C becomes higher than the pilot signal reproduced from the track A as shown at a part (b) of FIG. 3. In case that the position of the heads Ha and Hb is deviating from the track A toward the track C by as much as ½ track width, pilot signals are reproduced at the same level from the tracks A and C as shown at a part (c) of FIG. 3.

The fH and 3fH components are separated, respectively, by the BPF's 14 and 15 of FIG. 1 as mentioned in the foregoing. These components correspond to the pilot signals reproduced from the tracks B and C, respectively. In other words, in the case of the part (a) of FIG. 3, the outputs of the BPF's 14 and 15 are at the same amplitude. In the case of the part (b) or (c) of FIG. 3, one of the outputs of the BPF's 14 and 15 comes to have a large amplitude while the other has almost zero amplitude. In the event of the deviation of the position of the heads Ha and Hb toward the track B instead of toward the track C, the other of the outputs of the BPF's comes to have a large amplitude while the above-stated one of them has almost zero amplitude, in a manner reverse to the case of the part (b) or (c) of FIG. 3. In the event that the position of the heads Ha and Hb deviates to an extent of two track widths, the outputs of the BPF's 14 and 15 become the same as in the case of the on-track state. As apparent from the above description, in case that the record recorded in the SP mode is reproduced in the SP mode, the outputs of the BPF's 14 and 15 never come to simultaneously exceed a given amplitude, which is indicated by a symbol $V_H$ in FIG. 3. In the case of FIG. 1, the system controller 8 produces this amplitude level $V_H$ as a threshold level Vth. The outputs of the BPF's 14 and 15 are subjected to a detection process at the detecton circuits 16 and 17 and are then compared with the level $V_H$ at comparators 22 and 23. The output levels of these comparators 22 and 23 do not simultaneously become high. The level of an AND gate 24 also does not become high. The system controller 8 is arranged to supply the AND gate 24 and a NOR gate 25 with a signal S/L which is at a high level in the case of the SP mode reproduction and is at a low level in the case of the LP mode reproduction. The output level of the NOR gate 25 in this case is always low.

Therefore, the output level of an OR gate 26 does not become high.

Next, in case that a record, recorded in the LP mode in the tracks, is reproduced in the SP mode, the pilot signals are reproduced from the tracks A, B and C under the on-track condition, under the ½ track deviated condition and under the one track deviated condition as shown at parts (d), (e) and (f) of FIG. 3 respectively. Under the condition of the part (d) of FIG. 3, the pilot signals are reproduced from the tracks A, B and C at about the same amplitude. The level $V_H$ can be set at a smaller value than the outputs of the detection circuits 16 and 17 in this instance. Then, the output levels of both the comparators 22 and 23 are high. The signal S/L is also at a high level. Following this, the output level of the OR gate 26 becomes high. The high level output of the OR gate 26 is supplied to the system controller 8. Upon receipt of the high level output of the OR gate 26, the system controller changes the SP mode reproduction over to the LP mode reproduction. More specifically, the PG signal is synchronized with the revolution of the heads Hc and Hd by controlling the phase shifting circuit 7 in such a manner that the control target of the capstan control citcuit 20 is set at ½, the threshold level at a value $V_L$ and the level of the signal S/L at a low level.

Further, since the reproducing tape speed differs from the recording tape speed, the conditions shown at the parts (e) and (f) of FIG. 3 never last long. The condition shown at the part (d) of FIG. 3 is reached in a sufficiently short period of time. Then, the output level of the OR gate 26 becomes high to effect changeover to the LP mode reproducing operation.

In case that a record recorded in the SP mode in recording tracks is reproduced in the LP mode, the reproduced states of pilot signals becomes as shown at parts (g), (h) and (i) of FIG. 3. In this case, the threshold level Vth is at the value $V_L$ which is lower than the value $V_H$. However, in the case of the condition of the part (g) of FIG. 3, no pilot signal is reproduced from the tracks B and C. Therefore, the output levels of both the comparators 22 and 23 are low. The signal S/L is also at a low level. Therefore, the output level of the NOR gate 25 becomes high. As a result, the output level of the OR gate 26 becomes high to effect changeover from the LP mode reproduction to the SP mode reproduction. Further, the conditions shown at the parts (h) and (i) never last long and the condition of the part (g) of FIG. 3 will shortly obtain. Therefore, the change-over from the LP mode reproduction to the SP mode reproduction can be promptly effected.

When a record, recorded in the LP mode, is reproduced in the LP mode, the pilot signals are reproduced from the tracks in a manner as shown at parts (j), (k) and (l) of FIG. 3. In the case of an on-track state, the pilot signals are reproduced from the tracks B and C at equal amplitudes as shown at the part (j) of FIG. 3. In this instance, the levels of the outputs of the comparators 22 and 23 never simultaneously become low with the value $V_L$ set at a value smaller than the detection level of the reproduced amplitude. Under the conditions shown at the parts (k) and (l), one of the outputs of the comparators 22 and 23 of course becomes a high level. The output levels of the NOR gate 25 and the OR gate 26, therefore, do not become high.

In the case of special reproduction, the reproducing head repetitively comes to take the on-track, one-track deviated and ½ track deviated positions as shown in FIG. 3 because the tracing direction of the head differs from the direction of the recording tracks. If the reproduction is performed in the same time mode as in recording, therefore, the output of the AND gate 24 and that of the NOR gate 25 remain at low levels and no high level output is obtained from the OR gate 26. If the special reproduction is performed in a manner corresponding to the LP mode on the tracks having records recorded in the SP mode, the output level of the NOR gate 25 becomes high to cause the special reproduction to be accomplished in a manner corresponding to the SP mode. Further, in case that the special reproduction is performed in a manner corresponding to the SP mode on the tracks having records recorded in the LP mode, the output level of the AND gate 24 becomes high to cause the special reproduction to be accomplished in a manner corresponding to the LP mode.

The embodiment described is capable of promptly discriminating the track pitch at any tape speed despite of the extremely simple circuit arrangement and is capable of promptly performing a switch-over action between the SP mode reproduction and the LP mode reproduction according to the result of the discrimination as necessary.

In the embodiment, the number of different track pitches is arranged to be two. However, this can be changed to three or more with some modification in the selection of the threshold level Vth and the combination of the logic gates in accordance with this invention.

While different reproducing heads are arranged for the SP and LP modes, the arrangement may be changed to use the same head for the different modes with only the conditions shown at the parts (g) to (1) in FIG. 3 taken into consideration. In that instance, the track pitch also can be discriminated by an arrangement similar to the arrangement described.

Further, in the embodiment described, the tracking control and the track pitch discrimination are arranged to be accomplished by using the pilot signals reproduced from recording tracks neighboring the controlled track on both sides thereof. However, these actions may be arranged to be accomplished by using a reproduced signal which permits discrimination of the track or tracks from which one of or both of the pilot signals are reproduced.

What is claimed is:

1. An information signal reproducing apparatus for reproducing information signals from a record bearing medium on which said information signals are recorded in many recording tracks spaced at either a first or a second track pitch with four different pilot signals of four different frequencies recorded in rotation, along with said information signals, one in each of said recording tracks, comprising:
    (a) a first head having a head width corresponding to said first track pitch;
    (b) a second head with a head width corresponding to said second track pitch;
    (c) switching means for producing a reproduced signal by selectively producing either a signal reproduced from said record bearing medium by said first head or a signal reproduced from said medium by said second head;
    (d) tracking control means for controlling, with said pilot signals of four different frequencies included in said reproduced signal, the position of said head reproducing said reproduced signal and that of said record bearing medium relative to each other;

(e) detecting means for producing two detection signals, levels of said two detection signals respectively indicating levels of two of said pilot signals of four different frequencies included in said reproduced signal, said two pilot signals being recorded in two recording tracks;

(f) a pair of comparison means for respectively comparing said two detection signals with reference levels, said pair of comparison means being arranged to compare said two detection signals with a first reference level when said switching means is producing a signal reproduced by said first head and to compare said two detection signals with a second reference level when said switching means is producing a signal reproduced by said second head, respectively; and (g) switching control means for controlling said switching means on the basis of outputs of said pair of comparison means.

2. An apparatus according to claim 1, wherein said tracking control means includes a circuit which compares said two detection signals produced from said detecting means with each other.

3. An apparatus according to claim 2, wherein said detecting means includes a reference signal generating circuit which generates four different reference signals corresponding to said four different pilot signals; and a mixing circuit which mixes the reproduced signal produced from said switching means with said reference signal generated by said reference signal generating circuit.

4. An apparatus according to claim 3, wherein said four different pilot signals have frequencies f1, f2, f3 and f4 and are recorded in said many recording tracks in rotation in the sequence of f1→f2→f3→f4→f1→; and said four different reference signals generated by said reference signal generating circuit are arranged to have frequencies f1, f2, f3 and f4, respectively.

5. An apparatus according to claim 4, wherein, $$|f2-f1|=|f3-f4|=fA, \text{ and}$$
$$|f4-f1|=|f3-f2|=fB,$$

said detecting means includes first and second separation circuits which separate frequency components fA and fB from a mixed signal produced from said mixing circuit, and first and second detection circuits which detect the levels of the signals produced from said first and second separation circuits; and said first and second detection circuits are arranged to produce said two detection signals, respectively.

6. An apparatus according to claim 1, wherein said first track pitch is larger than said second track pitch; the head width of said first head is wider than that of said second head; and the level of said first reference level is higher than that of said second reference level.

7. An apparatus according to claim 6, wherein said switching control means is arranged to change said reproduced signal, which is to be produced from said switching means from the signal reproduced by said first head over to the signal reproduced by said second head when said pair of comparison means produce outputs indicating that both said two detection signals are at levels higher than said first reference level; and conversely to change said reproduced signal which is to be produced from said switching means from the signal reproduced by said second head over to the signal reproduced by said first head when said pair of comparison means produce outputs indicating that both said two detection signals are at levels lower than said second reference level.

8. An apparatus according to claim 1, further comprising moving means for moving said record bearing medium in a direction crossing said recording tracks.

9. An apparatus according to claim 8, wherein said tracking control means is arranged to control said moving means.

10. An apparatus according to claim 8, further comprising change-over means for effecting change-over of the medium moving speed of said moving means, on the basis of the outputs of said pair of comparison means, between a first speed, which corresponds to said first track pitch, and a second speed which corresponds to said second track pitch.

11. An apparatus according to claim 10, wherein said record bearing medium is in a tape shape; and said moving means is arranged to move said tape-shaped record bearing medium in a longitudinal direction thereof.

12. An apparatus according to claim 11, wherein said first and second heads are rotary heads which are respectively arranged to obliquely trace said tape-shaped record bearing medium.

13. An information signal reproducing apparatus for reproducing information signals from a record bearing medium on which said information signals are recorded in many recording tracks spaced at either a first or a second track pitch with four different pilot signals of four different frequencies recorded in rotation, along with said information signals, one in each of said recording tracks, comprising:

(a) head means for reproducing said information signals by tracing said record bearing medium;

(b) moving means for moving said record bearing medium in a direction crossing said recording tracks;

(c) tracking control means for controlling the position of said head means and that of said record bearing medium relative to each other by using said four different pilot signals included in the signal reproduced by said head means;

(d) detecting means for producing two detection signals, levels of said two detection signals respectively indicating levels of two of said four different pilot signals being recorded in two recording tracks;

(e) a pair of comparison means for respectively comparing said two detection signals with a reference level, said pair of comparison means being arranged to set said reference level at a first predetermined level when said record bearing medium is moved at a first moving speed by said moving means, and to set said reference level at a second predetermined level, which is lower than said first predetermined level, when said record bearing medium is moved at a second moving speed by said moving means; and (f) change-over means for effecting change-over of the medium moving speed of said moving means, on the basis of the outputs of said pair of comparison means, between said first moving speed, which corresponds to said first track pitch, and said second moving speed which corresponds to said second track pitch.

14. An apparatus according to claim 13, wherein said tracking control means is arranged to control said moving means.

15. An apparatus according to claim 13, wherein said first track pitch is larger than said second track pitch and said first moving speed is faster than said second moving speed.

16. An apparatus according to claim 15, wherein said change-over means is arranged to change said medium moving speed from one speed to the other when said pair of comparison means produce outputs indicating that said two detection signals are at higher levels than said reference level while said record bearing medium is moved at said first moving speed by said moving means and also when said outputs indicate that said two detection signals are at lower levels than said reference level while said medium is moved at said second moving speed by said moving means.

17. An apparatus according to claim 16, wherein said head means includes a first head which has a head width corresponding to said first track pitch; a second head which has a head width corresponding to said second track pitch; and a switching circuit which is arranged to switch from one over to the other a signal reproduced by said first head and a signal reproduced by said second head in response to the change-over action of said change-over means performed on said medium moving speed.

18. An information signal reproducing apparatus for reproducing information signals from a record bearing medium having many recording tracks which are formed with said information signals on said medium and are spaced at a track pitch selected from a plurality of different track pitch values, comprising:
 (a) head means for reproducing said information signals by tracing said record bearing medium;
 (b) tracking control means for controlling the position of said head means and that of said medium relative to each other by using signals reproduced by said head means;
 (c) detecting means which produces two detection signals, levels of said two detection signals respectively indicating levels of signals reproduced by said head means from two recording tracks;
 (d) a pair of comparison means for respectively comparing said two detection signals with either a first reference level or a second reference level; and
 (e) discriminating means for discriminating said track pitch on the basis of outputs of said pair of comparison means, said pair of comparison means being arranged to change the refernece level compared with said two detection signals between said first reference level and said second reference level on the basis of an output of said discriminating means.

19. An information signal reproducing apparatus for reproducing information signals from a record bearing medium on which said information signals are recorded in many recording tracks spaced at a track pitch selected from a plurality of different track pitch values with different pilot signals of four different frequencies recorded in rotation, along with said information signals, one in each of said recording tracks, comprising:
 (a) head means for reproducing said information signals by tracing said record bearing medium;
 (b) detecting means for producing two detection signals indicative of the levels of two of said four different pilot signals included in the signal reproduced by said head means;
 (c) a pair of comparison means for respectively comparing said two detection signals with either a first reference level or a second reference level; and
 (d) discriminating means for discriminating said track pitch on the basis of outputs of said pair of comparison means, said pair of comparison means being arranged to change the reference level compared with said two detection signals between said first reference level and said second reference level on the basis of an output of said discriminating means.

* * * * *